Dec. 9, 1941.   S. H. MORTENSEN ET AL   2,265,953
ROTARY SHAFT SEAL
Filed Dec. 28, 1939
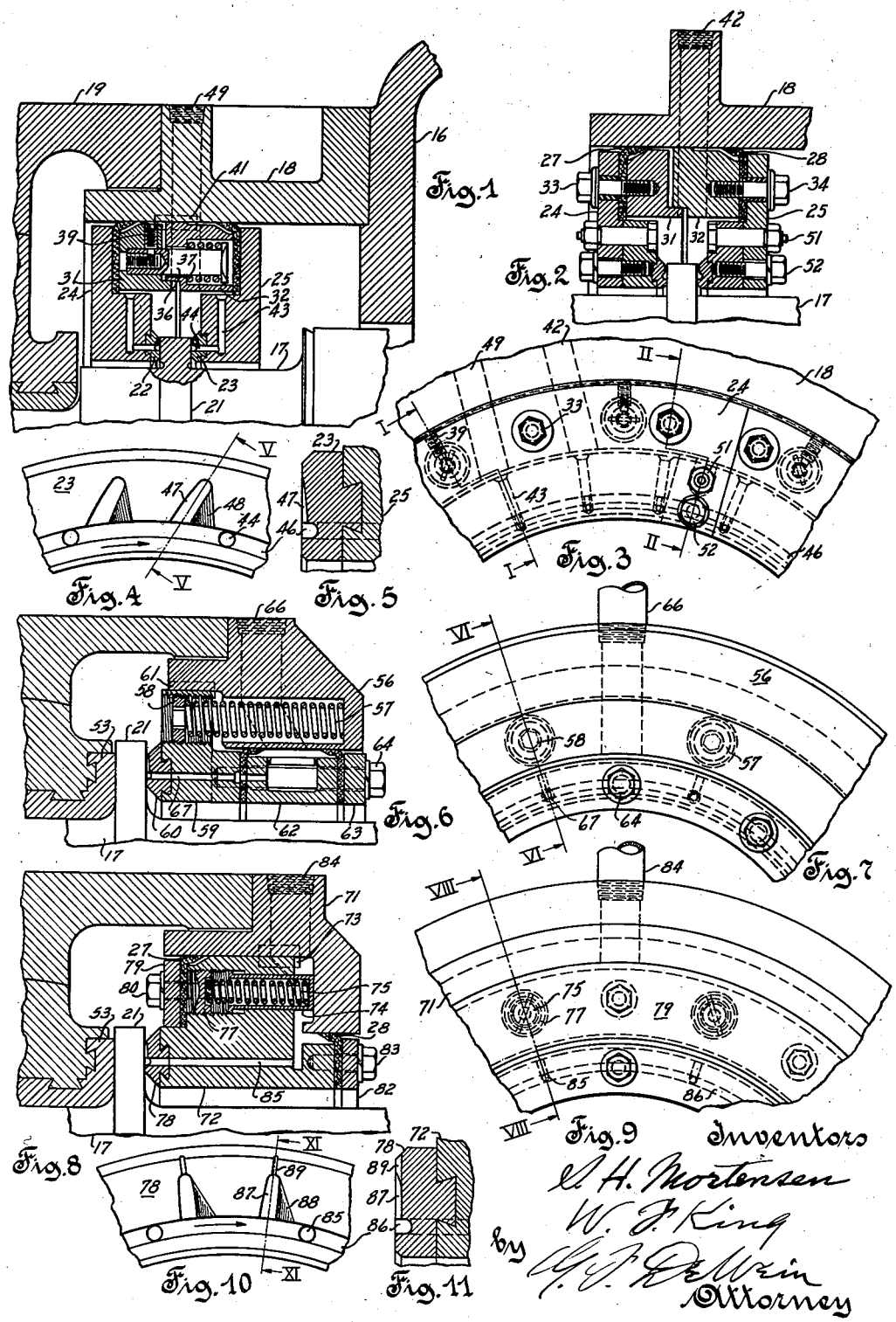
Inventors
S. H. Mortensen
W. J. King
by
Attorney Patented Dec. 9, 1941

2,265,953

UNITED STATES PATENT OFFICE 2,265,953

ROTARY SHAFT SEAL

Soren H. Mortensen, Wauwatosa, and William F. King, Milwaukee, Wis., assignors to Allis-Chalmers Manufacturing Company, Milwaukee, Wis., a corporation of Delaware Application December 28, 1939, Serial No. 311,236

3 Claims. (Cl. 286—9)

This invention relates to improvements in seals for the rotary shaft of machines operating in a gas of low density and particularly to rotary shaft seals for such machines in which the gas pressure is subject to wide variation.

Seals are required at joints between relatively moving machine parts whenever it is required to prevent passage of material through such joint and are particularly necessary about rotary shafts extending from a casing containing material to be retained therein or to be protected from contamination by extraneous material. The structure of such seals is determined by various conditions such as the material to be retained, the linear speed of the contact surfaces and the range of pressures to which the seal is subject. When sealing the shaft of a machine operating in a gas of low density such as the present day hydrogen cooled generator, the low density of the hydrogen and the need for continuous freedom from contamination of hydrogen by either oxygen or oil vapor presents requirements not known heretofore. Such generators usually operate at the speed of 3600 R. P. M. and the contacting surfaces should therefore be made small in diameter to limit the linear speed thereof. Even when the contacting surfaces are made as small as possible, the surfaces must be properly cooled and lubricated but flow of oil into the interior of the machine must be limited to prevent contamination of the hydrogen by oxygen carried by the oil and to reduce the amount of hydrogen entrained by the oil to the lowest possible value. Complete substitution of hydrogen for air in such generators requires that a seal be used which will be adequate for pressures ranging from a vacuum of twenty eight inches of mercury, when the generator is being filled with hydrogen, to pressures of ten to fifteen pounds gauge when the generator is to be overloaded. Further, every seal should also be axially movable to allow for expansion, should not require accurate centering on the shaft and should be self-alining to compensate for manufacturing inaccuracies.

It is therefore one of the objects of the present invention to provide a seal for relatively moving machine parts which as a whole form a casing for retaining a material of low density which must be protected from contamination.

Another object of the invention is to provide a seal for the rotary shaft of a machine having a casing subjected at different times to a vacuum and to high pressure and normally filled with a low density gas at a pressure slightly above atmosphere.

Another object of the invention is to provide a rotary shaft seal for a relatively high speed machine operating in hydrogen which must be retained therein in uncontaminated condition and in which the seal is subject to wide pressure variations.

Objects and advantages other than those above set forth will be apparent from the following description when read in connection with the accompanying drawing, in which:

Fig. 1 is a section taken on the plane I—I of Fig. 3 and showing the upper portion of a seal for the rotating shaft of a machine operating in a gas of low density;

Fig. 2 is a section taken on the plane II—II of Fig. 3 to show the manner in which the several annular members forming the seal are assembled about the shaft from the several parts forming each of such annular members;

Fig. 3 is an end elevation of the seal showing the arrangement of the spring means for securing the desired pressure of the contact surfaces, of the oil ducts leading to the contact surfaces and the arrangement of the bolts fastening together the several portions forming each of the annular members of the seal;

Fig. 4 is a plan view of an enlarged fragment of the contact surfaces of one of the several seal rings to show the shape and location of the oil ducts leading to such surfaces;

Fig. 5 is a cross section taken on the plane V—V of Fig. 4 to illustrate the relative depth and shape of the oil ducts leading to the contact surfaces;

Fig. 6 is a view taken on the plane VI—VI of Fig. 7 to illustrate a modification of the seal in which only one pair of contact surfaces are employed;

Fig. 7 is an end view of the seal structure shown in Fig. 6;

Fig. 8 is a view taken on the plane VIII—VIII of Fig. 9 to illustrate a seal structure differing somewhat from that shown in Fig. 6;

Fig. 9 is an end elevation of the seal structure shown in Fig. 8;

Fig. 10 is a plan view of an enlarged fragment of the contact surface employed in Figs. 6 to 9 inclusive to show the shape and location of the oil ducts leading to such surfaces; and Fig. 11 is a cross section taken on the plane XI—XI of Fig. 10 to illustrate the relative depth and shape of the oil ducts leading to the contact surfaces of the contact ring.

It will be understood that the lower portions of each of the seal structures are similar to the upper portions shown with the exceptions that all of the ducts connecting to the source of oil pressure are located in the upper portions of the seal shown in the drawing. It is therefore deemed unnecessary to illustrate any complete seal structure which illustration would involve only duplication of the parts already shown.

Referring more particularly to the drawing by characters of reference, the reference numeral 16 designates the casing of a machine intended to retain a gas of low density in uncontaminated condition, in the present instance considered as being a hydrogen cooled generator, from which a shaft 17 projects through the casing thus forming a joint between relatively movable parts to be sealed. The machine casing 16 has mounted thereon a seal casing 18 which is joined with an extension from the bearing bracket or pedestal 19. The joint between the machine casing 16 and the seal casing 18 is fixed and is sealed by known means such as a gasket, to minimize leakage of hydrogen therethrough, but the joint between the shaft 17 and the seal casing 18 must be sealed by means which will permit rotary and axial movement of the shaft while retaining the hydrogen in an uncontaminated condition under all conditions of operation of the machine.

Shaft 17 is formed with a flange 21 extending from the shaft and provided with plane and smooth side surfaces as a portion of the contacting surfaces of the seal structure. A plurality of rings 22, 23 provide contact surfaces preferably made of babbitt or other suitable low friction material and designed to bear against the sides of the flange 21. The sealing surface Babbitt rings are mounted in and form a portion of rings 24, 25 preferably made of hard and rigid material which rings are rabbeted about their circumference to receive cupped shaped rings 27 and 28 preferably of flexible oil resistant material set into the rabbeted portion of the rigid seal rings 24 and 25 and held therein by rings 31, 32 which clamp the flexible rings in such position that the peripheral portions thereof contact with the inner portion of the seal casing 18. The ring portions 24, 31 and 25, 32 are held in assembled relation by bolts 33 and 34 located at intervals about the peripheries of the ring. Rings 31 are provided with apertures therethrough in an axial direction to receive one end of partially hollow internally threaded pins 36 extending into axial apertures through the rings 32. Helical springs 37 are placed on the pins 36 between shoulders in the apertures through the rings 32 and shoulders on the pins 36. In assembling the seal, a stud may be threaded into the hollow internally threaded ends of the pins 36 to compress the springs 37 until an aperture in the pins 36 registers with threaded radial apertures in rings 31 which radial apertures are designed to receive set screws 39 to lock the pins 36 in a predetermined position. The springs 37 then act to draw the rings 24, 25 toward each other and thus press the contact surfaces of rings 22, 23 on the flange 21 at a predetermined constant value. Rings 24, 31 and 25, 32 are prevented from rotating, due to frictional engagement with the flange 21, by a loose fitting key or spline 41 securing the rings in the seal casing 18.

Friction between the flange 21 and contact rings 22, 23 is reduced and the contact surfaces are kept cool by oil under pressure supplied from a suitable source by way of a passage 42 to the space between the rings 24 and 25. The oil flows from such space through the passages 43 and 44 to a groove 46 extending circumferentially intermediate the edges of the contact rings 22, 23 but adjacent the inner edges of such surfaces and is distributed from such grooves to a series of oil pockets 47 extending from the grooves 46 outwardly toward the outer edge of the contact surfaces. A portion of the edge of each pocket 47 is cut away, on the side of the pocket in the direction of rotation of the flange 21, as indicated at 48 to form a surface inclined to the remainder of the contact surface for the purpose of insuring flow of oil from the pocket over the area of the contact surfaces of the rings 22, 23. It will be seen that the contact surfaces of the rings 22, 23 are divided into an inner uninterrupted ring surface and an outer uninterrupted ring surface with an intermediate surface provided with oil pockets having one side thereof cut down to insure the formation of a wedge shaped oil film between the contact surfaces of the rings and of the flange 21. Such formation of the contact surfaces of the rings 22, 23 is important to secure adequate cooling and lubrication with the minimum of oil flow radially inward between the rings and the flange.

Oil is admitted through opening 42 to the annular space between rings 24 and 25. The oil is carried circumferentially through the annular space by the pumping action of flange 21 and is discharged through opening 49. Opening 42 is located in advance of opening 49 in the direction of rotation of the flange. The oil admitted through opening 42 is in sufficient quantity for cooling purposes and under sufficient pressure to minimize the bearing load due to springs 37. A portion of the oil thus circulated feeds through the ducts 43 and 44 to the annular groove 46 and into pockets 47 and across the bearing face for lubrication. The arrangement of these grooves and pockets plus the centrifugal pumping action of the shaft flange causes the oil to flow radially outward rather than inward from groove 46. When vacuum is applied to the machine the oil pressure in the seal is reduced to one or two pounds per square inch above atmosphere. With the oil pressure reduced the spring force will overcome the tendency of the seal to open due to the reduced pressure on the hydrogen side of the seal.

Sufficient oil is supplied, at approximately five gallons per minute and preferably at pressures of 12 to 25 pounds per square inch. However even with circulation of the above quantity of oil at the above pressure, it is found that only one to five gallons of oil per hour flow over the inner surface of the contact rings 22, 23 into the space containing the hydrogen thus limiting contamination of the hydrogen by oxygen occluded from the oil and also limiting the entrainment of hydrogen by the oil. It will be seen that the oil pressure opposes the action of the springs 37 and thus determines the pressure between the flange 21 and the contact rings 22, 23.

It is of course necessary that the various rings forming the seal structure be divided into several portions to permit interchangeable assembly on the inner side of the flange 21. Each of the rings is accordingly preferably divided into half rings having the ends thereof formed to provide half lap joints as may be seen in Figs. 2 and 3. The lapped ends of the ring are then joined by fitted bolts 51 and studs 52.

A modified seal structure is illustrated in Figs. 6 to 11 inclusive in which only one pair of sealing surfaces is provided and in which the non-sealing side of the flange 21 provides a thrust shoulder for the guide bearing 53. As shown in Figs. 6 and 7, a sealed casing 56 is arranged to be joined with the machine casing 16 and is provided at intervals about its circumference with pockets or a groove to receive springs 57 which extend into the pockets through internally threaded apertures through the seal ring and which are compressed between the bottom of the casing pocket and plugs 58 screwed into the ring apertures. The seal ring includes a portion 59 bearing a contact ring 60 and ring portions 62 and 63 which serve as clamping rings to retain the flexible sealing rings 27 and 28 when drawn tight to the ring 59 by studs 64. Ring 59 is keyed or splined to casing 56 by a key or spline 61. In the present structure, oil is supplied by way of the passageway 66 to the space between the flexible rings 27 and 28 and passes through a duct 67 to a groove in the contact ring 60. It has been found that adequate lubrication and cooling of the contact surfaces can be obtained in the present structure without the circulation of oil through the annular space between the rings 27 and 28 and that the oil need only be under a pressure of five to ten pounds per square inch. No oil discharge passage is therefore provided and the only flow taking place is that resulting between the flange 21 and the contact ring 60.

The structure shown in Figs. 8 and 9 differs from that described in each of the above constructions, particularly, in the employment of oil pressure to aid the springs in producing the desired sealing ring contact pressure on the flange 21. A seal casing 71 is fixedly joined to the machine casing 68 and the sealing ring 72 is keyed to the casing 71 by a key or spline 73. Passageways through the ring 72 receive movable casings 74 for springs 75 and are internally threaded to receive plugs 77 for compressing the springs 75 between the seal casing and the plugs. The ring 72 bears a contact ring 78 and a flexible ring 27 is clamped to one side of the ring 72 by a ring 79 secured by bolts 80. The flexible ring 28 is clamped to the other side of the ring 72 by a clamping ring 82 secured thereto by bolts 83. Oil is supplied to the annular space between the flexible rings 27 and 28 by way of a passageway 84 and passes through a duct 85 to a groove in the contact surface of the ring 78. In the present construction, oil pressure in the space between the rings 27 and 28 acts on a surface of the ring 72 to aid the springs 75 in securing the desired pressure between the contact surfaces of the flange 21 and of the ring 78.

The arrangement of grooves in the contact surfaces of the rings 60 and 78 respectively is shown in Figs. 10 and 11 as applied to ring 78. The contact surface of ring 78 is provided with a circumferential groove 86 connected with oil ducts 85. Oil pockets 87 extend outwardly from the groove 86 and have one edge thereof cut down to form a surface 88 inclined relative to the remainder of the contact surface of the ring and on the side of pockets 87 in the direction of rotation of the flange 21. Each of the oil pockets is connected with a groove 89 passing through the outer ring surface of the ring 86 to provide a slight flow of oil through such groove to provide adequate cooling of the contact surface. The present grooving of the contact ring surface therefore provides only an inner uninterrupted ring surface and an outer surface containing oil pockets and grooves.

It will be seen that the present invention provides an effective seal for the rotary shaft of a high speed machine operating in a gas of low density which must be retained free from contamination and which is subject to widely varying pressures. The several divided rings forming the seal, which are joined to provide a complete seal structure, form a seal between a relatively fixed and relatively movable portion of the structure. The contact surfaces are pressed together by a predetermined spring pressure aided or opposed by a fluid pressure which provides the seal force for relatively fixed portions of the seal and also cools and lubricates the relatively moving contact surfaces. Such cooling and lubrication is produced by oil distributed over the contact surfaces by grooves supplying specially formed oil distributing pockets to minimize the oil flow required between the contact surfaces for the minimizing of friction and hence to minimize the contamination of gas by the oil or of the oil by foreign material.

The sealing ring can be forced against the shaft flange 21 by springs alone, by oil pressure alone or by a combination of the two. The seal is designed so that the effective area acted upon by the gas pressure or vacuum in the machine may be reduced to zero, and the bearing pressure of the contact surfaces will be independent of the gas pressure in the machine. By suitable proportioning, the seal will function for any combination of gas pressure, oil pressure and spring loading. The grooves 89 are designed to pass an adequate quantity of oil for cooling. The arrangement of grooving causes the oil flow to be radially outward rather than inward.

Although but a few embodiments of the present invention have been illustrated and described it will be apparent to those skilled in the art that various changes and modifications may be made in the present invention without departing from the spirit thereof or from the scope of the appended claims.

It is claimed and desired to secure by Letters Patent:

1. In a seal between relatively moving machine parts, a flange extending from one of the parts to provide a contact surface, a seal ring extending from the other of the machine parts and having a surface movable substantially into contact with the contact surface of said flange, the contact surface of said seal ring being provided with a groove extending circumferentially intermediate the edges thereof and with grooves extending radially outwardly from the circumferential groove, the radial grooves being formed with a larger section portion and a smaller section portion of uniform cross sectional area from end to end to secure lubricant distribution over the contact surface and discharge of lubricant from between the contact surface, the orifice at the juncture of said smaller groove section with said larger groove section limiting the lubricant discharge from between the contact surfaces to a predetermined quantity, a spring extending between said ring and said other machine part to press the contact surface of said ring toward the contact surface of said flange, and oil ducts formed in said ring to conduct oil to the circumferential groove thereof.

2. In a seal between relatively moving machine parts, a flange extending from one of the parts to provide a contact surface, a plurality of rigid sealing rings extending from the other of the machine parts and each having a surface movable into contact with the contact surface of said flange, the contact surface of each of said rigid rings being provided with a groove extending intermediate the edges thereof and with grooves extending radially outwardly from the intermediate groove, a plurality of cup shaped rings of flexible oil resistant material clamped between said rigid rings and sealing the same with said other machine part to define a path for the flow of oil to the contact surfaces and to prevent oil flow into the machine other than the flow passing between the contact surfaces from the grooves, a spring extending between said rigid rings and said other machine part to press the contact surfaces of said rigid rings toward the contact surface of said flange, and oil ducts formed in said rigid rings to conduct oil to the intermediate groove thereof.

3. In a seal between relatively moving machine parts, a flange extending from one of the machine parts, a seal ring extending from the other of the machine parts and provided with a face of low friction material, the face of said ring being formed with a groove intermediate the edges of the face and with grooves extending radially outwardly from the intermediate groove, said ring having a partially threaded passage extending therethrough formed with a shoulder intermediate its length, a flanged casing movably mounted in and extending from the passage into contact with the other of the machine parts, a spring mounted in the passage and in said casing, and a nut threaded into the passage for adjustably compressing said spring to force the face of said ring on said machine part flange.

SOREN H. MORTENSEN.
WILLIAM F. KING.